(12) United States Patent　(10) Patent No.: US 7,676,984 B2
Mark　(45) Date of Patent: Mar. 16, 2010

(54) ENERGY ABSORBING SUPPORT FOR DOWNRIGGER WEIGHT

(76) Inventor: Rubbert Mark, 2660 NE. Highway 20, #610-303, Bend, OR (US) 97701

( * ) Notice: Subject to any disclaimer, the term of this patent is extended or adjusted under 35 U.S.C. 154(b) by 150 days.

(21) Appl. No.: 11/807,916

(22) Filed: May 29, 2007

(65) Prior Publication Data

US 2008/0000144 A1　Jan. 3, 2008

Related U.S. Application Data

(60) Provisional application No. 60/809,113, filed on May 26, 2006.

(51) Int. Cl.
*A01K 91/08*　(2006.01)
(52) U.S. Cl. .................. 43/42.72; 43/27.4; 43/43.13
(58) Field of Classification Search ............ 43/42.72, 43/43.13, 43.12, 27.4
See application file for complete search history.

(56) References Cited

U.S. PATENT DOCUMENTS

| | | | | |
|---|---|---|---|---|
| 1,438,476 A * | 12/1922 | Bley, Sr. | .................... | 43/42.72 |
| 1,723,814 A * | 8/1929 | Scholl | ........................ | 43/42.72 |
| 2,085,320 A * | 6/1937 | Kolstrand | .................. | 43/42.72 |
| 2,108,598 A * | 2/1938 | Burr | ........................ | 43/44.98 |
| 2,117,322 A * | 5/1938 | Hillman | ..................... | 43/42.72 |
| 2,151,609 A * | 3/1939 | Menderman | ............... | 43/44.83 |
| 2,218,946 A * | 10/1940 | Barnett | ..................... | 43/42.72 |
| 2,231,616 A * | 2/1941 | Costantino | ................ | 43/42.72 |
| 2,267,285 A * | 12/1941 | McCrave | .................. | 43/42.72 |
| 2,359,588 A * | 10/1944 | Shea | ........................ | 43/43.12 |
| 2,488,475 A * | 11/1949 | Merritt | ..................... | 43/42.72 |
| 2,492,638 A * | 12/1949 | Hickson | .................... | 43/42.74 |
| 2,606,390 A * | 8/1952 | Farmer | ..................... | 43/42.72 |
| 2,619,763 A * | 12/1952 | Siebert | ...................... | 43/42.43 |
| 2,651,134 A * | 9/1953 | Kemmerer | .................. | 43/43.4 |
| 2,768,468 A * | 10/1956 | Kibler et al. | ................ | 43/43.12 |
| 2,814,903 A * | 12/1957 | Banowetz | .................. | 43/43.13 |
| 2,841,911 A * | 7/1958 | Dahlgren | ................... | 43/43.12 |
| 2,977,710 A * | 4/1961 | Stambaugh | ................. | 43/44.2 |
| 3,318,037 A * | 5/1967 | Harrison et al. | ............ | 43/42.72 |
| 3,426,469 A * | 2/1969 | Lee et al. | .................. | 43/43.12 |
| 3,714,730 A * | 2/1973 | Lloyd | ........................ | 43/42.72 |
| 3,744,177 A * | 7/1973 | Cron, Jr. | .................... | 43/43.12 |
| 3,745,688 A * | 7/1973 | Brownlee | .................. | 43/42.72 |
| 3,778,871 A * | 12/1973 | Ratte, Jr. | .................... | 43/44.87 |
| 3,800,458 A * | 4/1974 | Swanby | ..................... | 43/43.12 |
| 3,834,059 A * | 9/1974 | Overstreet | ................. | 43/43.12 |
| 3,835,571 A * | 9/1974 | Berry | ........................ | 43/43.12 |
| 3,937,415 A * | 2/1976 | Prinz | ......................... | 43/27.4 |
| 3,942,282 A * | 3/1976 | Flagel | ........................ | 43/44.2 |
| 3,982,350 A * | 9/1976 | Heckathorn | ................. | 43/43.1 |
| 3,991,505 A * | 11/1976 | Simeti | ....................... | 43/43.12 |
| 4,050,180 A * | 9/1977 | King | .......................... | 43/27.4 |
| 4,065,869 A * | 1/1978 | Berry | ........................ | 43/43.12 |
| 4,069,611 A * | 1/1978 | Dusich et al. | ............. | 43/43.12 |
| 4,128,960 A * | 12/1978 | Marek | ........................ | 43/27.4 |
| 4,177,599 A * | 12/1979 | Pettersen | .................... | 43/43.12 |
| 4,215,505 A * | 8/1980 | Henze et al. | ................. | 43/27.4 |
| 4,267,659 A * | 5/1981 | Grasso | ....................... | 43/43.12 |
| 4,494,334 A * | 1/1985 | Porter | ....................... | 43/43.12 |
| 4,538,372 A * | 9/1985 | Petigoretz | ................... | 43/27.4 |
| 4,565,026 A * | 1/1986 | Bohme | ....................... | 43/43.12 |

(Continued)

*Primary Examiner*—Darren W Ark

(57) ABSTRACT

An energy absorbing member for use in suspending a weight to a downrigger assembly for fishing. The member is formed of a viscoelastic material.

6 Claims, 5 Drawing Sheets

U.S. PATENT DOCUMENTS

| | | | | |
|---|---|---|---|---|
| 4,628,630 A * | 12/1986 | Bohme | | 43/43.12 |
| 4,638,587 A * | 1/1987 | Koch | | 43/43.12 |
| 4,667,892 A * | 5/1987 | Pease | | 43/27.4 |
| 4,691,467 A * | 9/1987 | Brimmer | | 43/44.4 |
| 4,733,492 A * | 3/1988 | Thompson | | 43/27.4 |
| 4,785,570 A * | 11/1988 | Koch | | 43/43.12 |
| 4,813,172 A * | 3/1989 | McCue | | 43/43.12 |
| 4,821,449 A * | 4/1989 | Hafer | | 43/43.12 |
| 4,843,755 A * | 7/1989 | Lin | | 43/42.72 |
| 4,852,292 A * | 8/1989 | Pease | | 43/27.4 |
| 4,907,347 A * | 3/1990 | Pease | | 43/27.4 |
| 5,018,296 A * | 5/1991 | Putz, II | | 43/43.12 |
| 5,054,227 A * | 10/1991 | Lin | | 43/43.12 |
| 5,088,228 A * | 2/1992 | Waldie, Jr | | 43/43.12 |
| 5,150,540 A * | 9/1992 | Bennett | | 43/43.12 |
| 5,197,223 A * | 3/1993 | Spurgeon | | 43/43.12 |
| 5,212,901 A * | 5/1993 | Bishop et al. | | 43/42.72 |
| 5,279,066 A * | 1/1994 | Camera | | 43/42.72 |
| 5,337,510 A * | 8/1994 | McCue | | 43/43.12 |
| 5,375,365 A * | 12/1994 | Bronder | | 43/43.12 |
| 5,867,932 A * | 2/1999 | Reiger | | 43/43.13 |
| 5,901,495 A * | 5/1999 | Leigeber | | 43/43.12 |
| 6,732,470 B1 * | 5/2004 | Bennett | | 43/43.12 |
| 7,152,362 B2 * | 12/2006 | Holbrook | | 43/43.12 |
| 7,197,847 B2 * | 4/2007 | Albrant, Jr. | | 43/27.4 |
| 7,621,072 B2 * | 11/2009 | Brasseur | | 43/44.97 |
| 2006/0026892 A1 * | 2/2006 | Nakamichi | | 43/44.85 |
| 2006/0168874 A1 * | 8/2006 | Hull | | 43/43.13 |
| 2006/0248779 A1 * | 11/2006 | Settele | | 43/43.12 |
| 2007/0119091 A1 * | 5/2007 | Osborn et al. | | 43/43.13 |
| 2007/0214703 A1 * | 9/2007 | McKelvey | | 43/42.72 |
| 2008/0216388 A1 * | 9/2008 | Thorsen | | 43/100 |

* cited by examiner

ENERGY ABSORBING SUPPORT FOR DOWNRIGGER WEIGHT

RELATED APPLICATIONS

This application claims priority to U.S. Ser. No. 60/809,113, which was filed on May 26, 2006.

BACKGROUND

This application relates to fishing equipment, and in particular to suspending weights used to position a lure or bait at a desired depth in the water. In many instances when fishing it is often necessary to position the lure or bait at a predetermined depth beneath the surface of the water. In many cases this depth can be far below the surface. If trolling a great deal of weight can be required.

The downrigger is typically a winch like apparatus that includes a line or cable wound on a spool and that can be fed out to a desired length. The cable terminates at a fixture that includes a first attachment point for a weight and a second attachment point for a fishing line. A weight is attached to the terminal fixture. The fishing line that includes the lure or bait is also attached to the terminal fixture by way of a releasable clip. The releasable clip is designed so that the pressure applied to the fishing line when a fish strikes the lure releases the fishing line from the terminal fixture. The fisherman is then left to play and land the fish without the significant added weight of the downrigger weight.

It is normal practice to attach the downrigger weight to the terminal fixture by what is referred to as a snubber. When fishing in the ocean or other large bodies of water waves often cause sudden movement of the boat and the attached arm that suspends the downrigger. If the downrigger weight is "rigidly" attached to the terminal fixture the sudden movement of the boat can transmit sharp shocks to the fishing line and cause it to break or to release from the terminal device. A snubber is used to prevent those shocks from breaking the relatively light fishing line or prematurely releasing the fishing line from the terminal device. Snubbers also serve as a severable link between the weight and the downrigger in case the weight becomes entangled and can't be freed. In addition the snubber will electrically isolate the weight from the remainder of the downrigger and fishing equipment.

Prior art snubbers consist of a single strand of elastic material fitted with a connector on each end. The connectors are used to attach the snubber to the terminal device on one end and the downrigger weight on the other end. Prior art snubbers are problematic for several reasons. First, they stretch too much, especially when heavy downrigger weights are used. As the weights are lifted from the water prior art snubbers stretch to the point where either the weight is not clear of the water. Even if the weight is clear of the water, in rough water it is prone to violent swings that can result in the weight hitting and damaging the boat. This poses a significant risk to the boat and its occupants, especially when fishing far from shore.

Prior art snubbers are also deficient in that while they are elastic and spread out the sharp energy spikes associated with sudden shocks, they don't effectively reduce the total energy delivered to the downrigger. The energy is delivered in a series of lower energy spikes, i.e. bounces, as the elastic snubber stretches and contracts. While it is better that the weight bounces several times and transmits less shock to the downrigger with each bounce, it would be preferable if the shock energy could be dissipated.

A need therefore exists for an improved snubber that provides shock and electrical isolation between the weight and downrigger, and which overcomes the shortcomings of the prior art.

SUMMARY OF THE INVENTION

This invention overcomes the shortcomings of the prior art by providing an improved snubber that is economical to manufacture, that is easily attached to the terminal fixture of the downrigger and to the weight without the need for connectors attached to the snubber during manufacture, and that more effectively isolates the terminal fixture from shocks resulting from sudden relative movement between terminal fixture and the weight.

The invention is embodied in a continuous loop of polymeric material that is elastic and which in addition is dissipates significant amounts of energy as it deforms and returns to its normal shape under the forces associated with the sudden relative movement between the boat and the weight. In this way a snubber according to the invention does not merely reduce the magnitude of energy spikes transmitted to the downrigger, but in addition reduces the total energy transmitted to the downrigger. A snubber according to the invention embodies an additional advantage in that a single snubber can be used with different weights by being configured to suspend the weight with 2 strands of material or 4 strands of material.

These and other aspects of the invention will be described by reference to the drawings.

DETAILED DESCRIPTION

Figure 1:
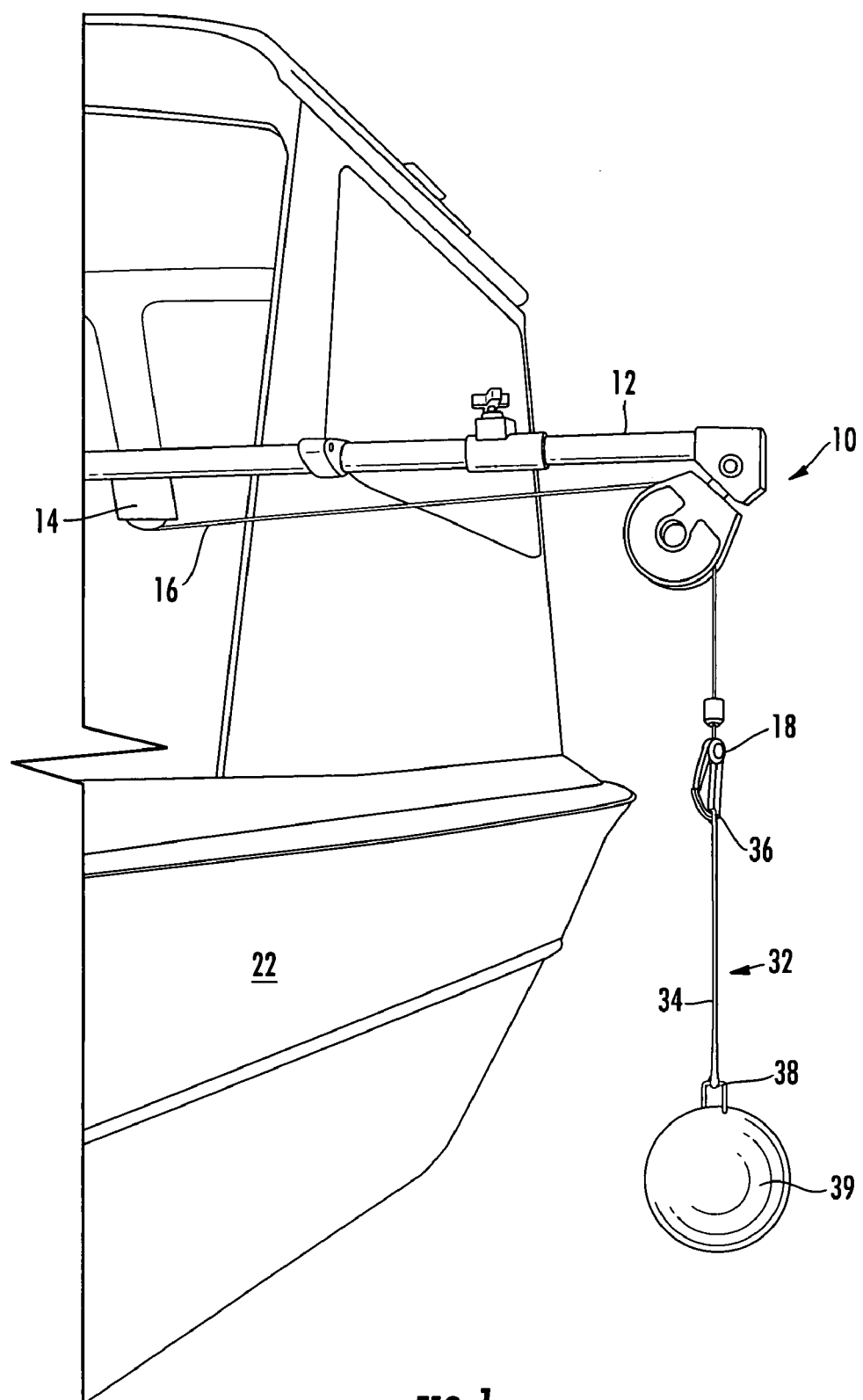
FIG. 1 is a schematic view of a downrigger assembly mounted on a boat wherein the downrigger weight is attached using a prior art snubber.
Figure 2:
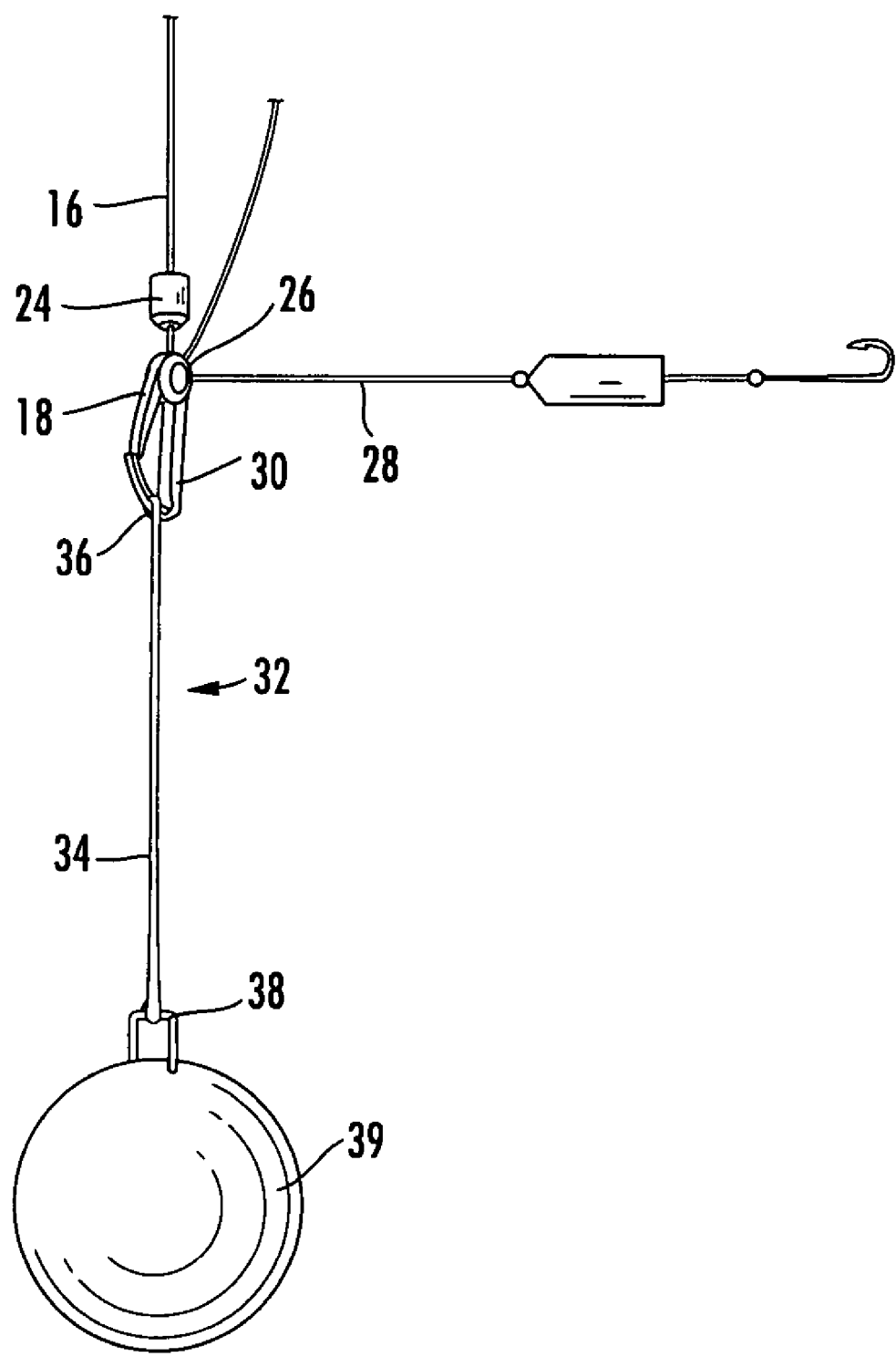
FIG. 2 is a side elevational view of a downrigger terminal fixture illustrated in FIG. 1 and showing the attachment of the fishing line, and the attachment of the downrigger weight using a prior art snubber.
Figure 3:
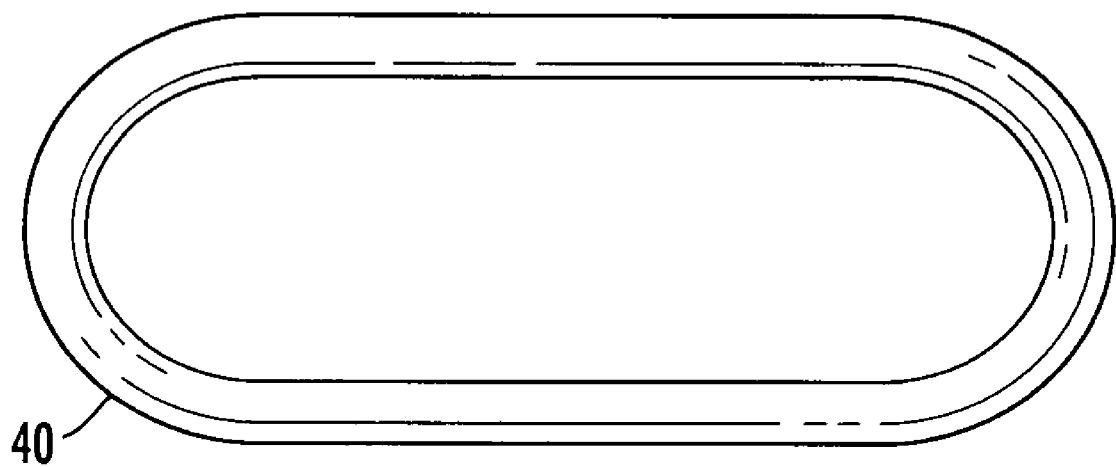
FIG. 3 is a top plan view of a snubber according to a preferred embodiment of the invention.
Figure 4:
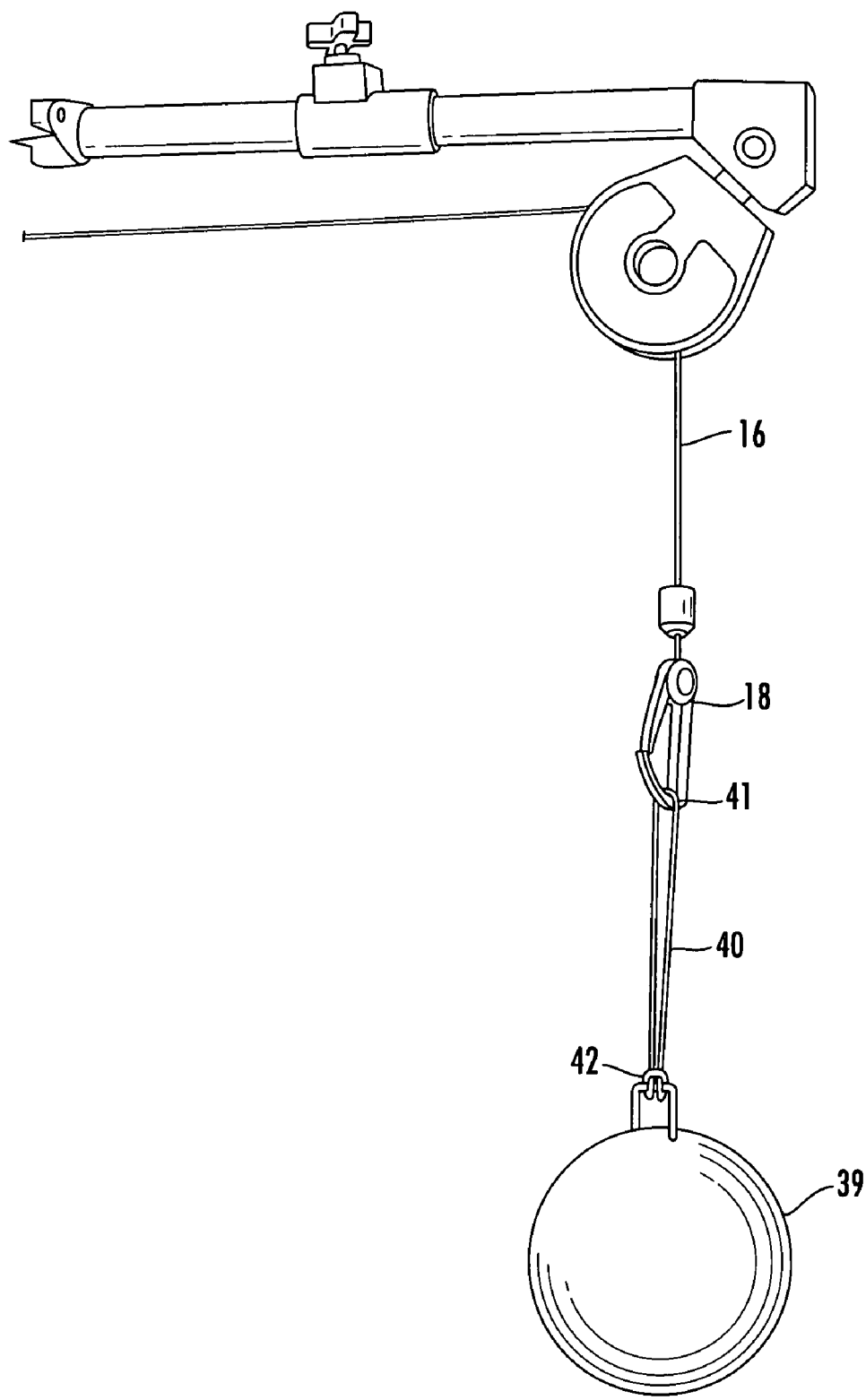
FIG. 4 is a side elevational view of a downrigger incorporating a snubber according to the invention in a 2 strand configuration.

Turning now to FIG. 1, a downrigger is shown generally at 10, and includes an arm 12, a winch 14, a cable 16, and a terminal fixture 18. Arm 12 is mounted on the gunwhale of a boat 22. FIG. 2 shows a typical terminal fixture 18 that includes a connector 24 to attach terminal fixture 18 to cable 16, a release mechanism 26 that attaches the fishing line 28 to terminal fixture 18, and a connector 30 to which a prior art snubber 32 is attached. Snubber 32 includes a body 34 and top and bottom connectors 36 and 38. Weight 39 is attached to snubber 32 by connector 38.

Figure 5:
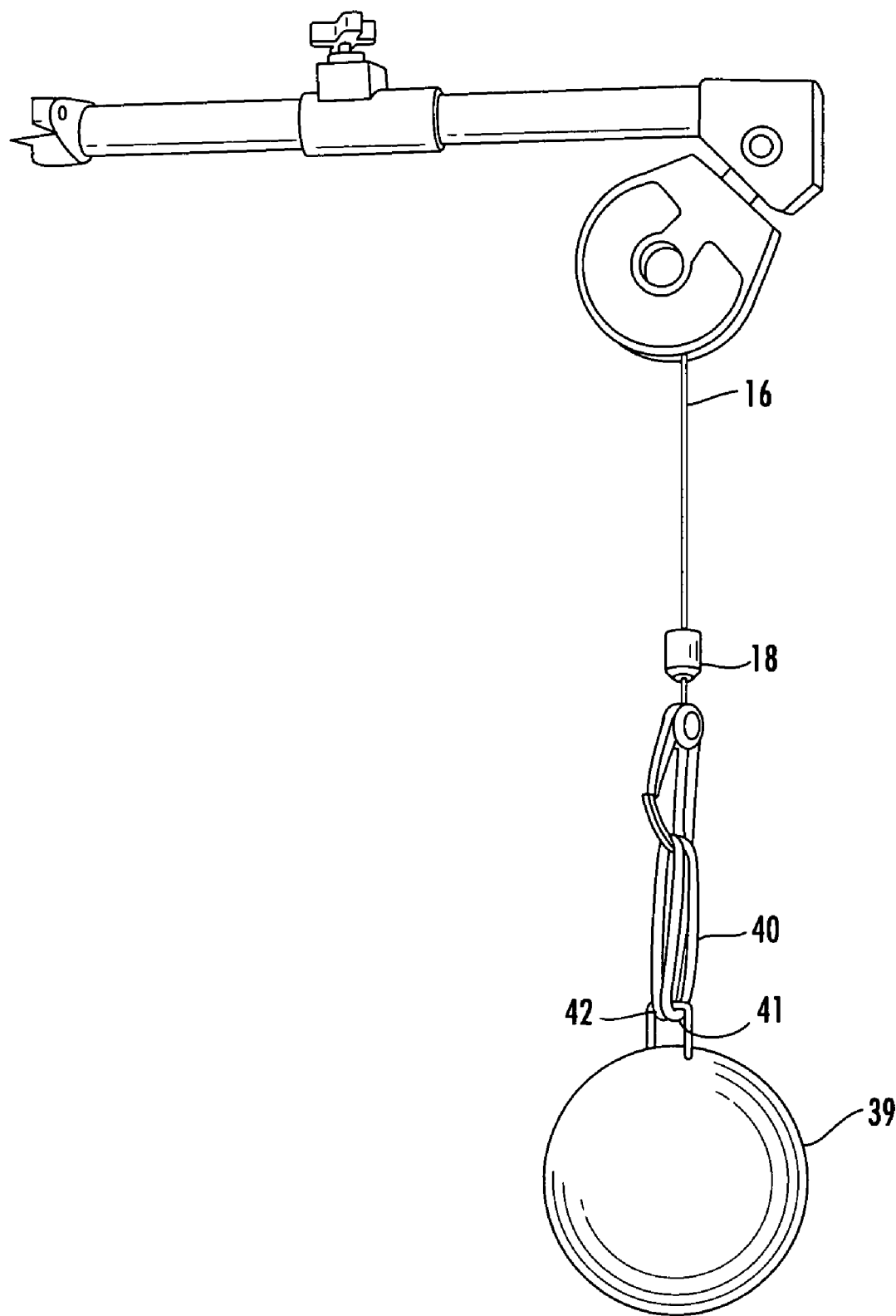
FIG. 5 is a side elevational view of a downrigger incorporating a snubber according to the invention in a 4 strand configuration.

Turning now to FIGS. 3-6 a snubber according to the invention is shown at 40. Snubber 40 is a continuous loop of a flexible, viscoelastic material. Snubber 40 can be configured to suspend weight 39 by two strands of material (FIG. 4), or in a 4-strand configuration (FIG. 5). In the two strand configuration one end of snubber 40 is passed through a connector 42 on weight 39 and back through itself to form cinch connector 42 in a loop 44. The free end 41 of snubber 40 is then connected to connector 38 to attach weight 39 to terminal fixture 18.

Referring to FIG. 5, when configured in a 4-strand configuration snubber 40 is inserted through connector 42 on weight 39 and then both ends 41 and 43 of snubber 40 are connected to lower connector 38 of terminal fixture 18.

In preferred embodiment of the invention snubber 40 is made from a viscoelastic material known as EPDM, ethylene-propylene-diene monomer, that is widely available. EPDM has been widely used in automotive weather-stripping and seals, glass-run channel, radiator, garden and appliance hose, tubing, belts, electrical insulation, roofing membrane, rubber mechanical goods, plastic impact modification, thermoplastic vulcanisates and motor oil additive applications. However, the combination of elasticity and energy dissipation described above with reference to the invention have not previously been recognized in these materials, and have not been recognized as advantageous in this application.

The snubber can be of any diameter or length. In one preferred embodiment the diameter is 0.23" and the total length is 11", although the invention is not limited to any particular dimension. While the preferred embodiment makes use of EDPM having a durometer hardness of 70 durometer, other viscoelastic materials of similar elastic and viscoelastic properties could be substituted without departing from the scope of the invention.

In the preferred embodiment of the invention the loop has a circular cross sectional shape, although the invention is not limited to any particular cross-sectional shape. In addition in preferred embodiments of the invention the loop is solid and not hollow, although once again the invention encompasses a loop of hollow material as well.

The snubber of the present invention provides significant advantages over the prior art. The combination of configuration and material provides greater dampening while also providing significant energy dissipation. It achieves these advantages while undergoing less stretching and thereby avoids the stretching-related problems associated with prior art snubbers.

While the invention has been described by reference to preferred embodiments, those of skill in the art will appreciate that the invention can be modified in various aspects without departing from the scope of the invention.

The invention claimed is:

1. In a downrigger for use in fishing and including a weight suspending cable, a terminal fixture attached to one end of the weight suspending cable and a weight having a connection loop extending therefrom, the improvement comprising:
    a continuous loop of viscoelastic material comprising two strands which integrally connect to each other at opposing ends of said continuous loop, said continuous loop of viscoelastic material having a configuration connecting the terminal fixture and the weight, said configuration comprising one of said opposing ends of said continuous loop being passed through said connection loop of said weight so that said one of said opposing ends is located on one side of said connection loop and a remainder of said continuous loop with an other end of said opposing ends is located on an opposing side of said connection loop, then said one of said opposing ends is passed through said remainder of said continuous loop between said two strands so that said two strands extend through said connection loop with said other end of said opposing ends abutting said two strands and said connection loop, said one of said opposing ends being looped over a projecting portion of said terminal fixture so that said projecting portion extends within said continuous loop and between said two strands, wherein said configuration further comprises two generally parallel strand portions of said two strands extending between said terminal fixture and said connection loop of said weight, viscoelastic material deforming and simultaneously dissipating energy responsive to a tensile force urging the weight away from the terminal fixture; and, the continuous loop of viscoelastic material distributing the tensile force through the two strands of viscoelastic material.

2. A downrigger according to claim 1 wherein the viscoelastic material comprises an ethylene-propylene-diene monomer.

3. A downrigger according to claim 1 wherein the continuous loop comprises a durometer hardness of about 70.

4. In a downrigger for use in fishing and including a weight suspending cable, a terminal fixture attached to one end of the weight suspending cable and a weight having a connection loop extending therefrom, the improvement comprising:
    a continuous loop of viscoelastic material comprising two strands which integrally connect to each other at opposing ends of said continuous loop, said continuous loop of viscoelastic material having a configuration connecting the terminal fixture and the weight, said configuration comprising one of said opposing ends of said continuous loop being passed through said connection loop of said weight so that said one of said opposing ends is located on one side of said connection loop and said two strands extend through said connection loop and an other end of said opposing ends is located on an opposing side of said connection loop, said opposing ends being looped over a projecting portion of said terminal fixture so that said projecting portion extends within said continuous loop and between both said two strands and said opposing ends, wherein said configuration further comprises four generally parallel strand portions of said two strands extending between said terminal fixture and said connection loop of said weight, the viscoelastic material deforming and simultaneously dissipating energy responsive to a tensile force urging the weight away from the terminal fixture; and, the continuous loop of viscoelastic material distributing the tensile force through said four generally parallel strand portions.

5. A downrigger according to claim 4 wherein the viscoelastic material comprises an ethylene-propylene-diene monomer.

6. A downrigger according to claim 4 wherein the continuous loop comprises a durometer hardness of about 70.

\* \* \* \* \*